United States Patent
Savchenko et al.

(10) Patent No.: US 10,731,987 B2
(45) Date of Patent: Aug. 4, 2020

(54) THREE-PUMP STIMULATED BRILLOUIN SCATTERING GYROSCOPE

(71) Applicant: Honeywell International Inc., Morris Plains, NJ (US)

(72) Inventors: Arthur Savchenko, Kirkland, WA (US); Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/179,437

(22) Filed: Nov. 2, 2018

(65) Prior Publication Data
US 2020/0141731 A1 May 7, 2020

(51) Int. Cl.
*G01C 19/66* (2006.01)
*H01S 3/30* (2006.01)
*H01S 3/083* (2006.01)

(52) U.S. Cl.
CPC .......... *G01C 19/661* (2013.01); *H01S 3/083* (2013.01); *H01S 3/302* (2013.01)

(58) Field of Classification Search
CPC .... G01C 19/04; G01C 19/662; G01C 19/661; H01S 3/302; H01S 3/2383; H01S 3/083
See application file for complete search history.

(56) References Cited

U.S. PATENT DOCUMENTS

| 4,159,178 A | 6/1979 | Vali et al. |
| 4,396,290 A | 8/1983 | Morris |
| 5,064,288 A | 11/1991 | Dyes et al. |
| 5,408,317 A | 4/1995 | Dyes et al. |

(Continued)

FOREIGN PATENT DOCUMENTS

CN 101067556 A 11/2007

OTHER PUBLICATIONS

European Patent Office, "Extended European Search Report from EP Application No. 19194496.6", from Foreign Counterpart to U.S. Appl. No. 16/179,437, dated Apr. 2, 2020, pp. 1 through 7, Published: EP.

(Continued)

*Primary Examiner* — Michael P LaPage
(74) *Attorney, Agent, or Firm* — Fogg & Powers LLC

(57) ABSTRACT

A stimulated Brillouin scattering (SBS) gyroscope comprises a resonator; a first laser in communication with the resonator and configured to emit a first optical signal propagating in a first direction, the first optical signal producing a first SBS signal counter-propagating in a second direction; a second laser in communication with the resonator and configured to emit a second optical signal propagating in the first direction, the second optical signal producing a second SBS signal counter-propagating in the second direction; a third laser in communication with the resonator and configured to emit a third optical signal propagating in the second direction, the third optical signal producing a third SBS signal counter-propagating in the first direction. At least one photodetector is coupled to the resonator and receives the SBS signals, which are combined in the photodetector to produce electrical signals that include rotational rate information encoded in frequencies of the electrical signals.

18 Claims, 2 Drawing Sheets

(56) References Cited

U.S. PATENT DOCUMENTS

| | | | |
|---|---|---|---|
| 5,537,671 A * | 7/1996 | Toyama | G01C 19/72 |
| | | | 356/461 |
| 7,522,284 B2 | 4/2009 | Sanders et al. | |
| 7,697,143 B2 | 4/2010 | Sanders et al. | |
| 7,933,020 B1 | 4/2011 | Strandjord et al. | |
| 8,009,296 B2 * | 8/2011 | Sanders | G01C 19/727 |
| | | | 356/461 |
| 8,830,478 B2 | 9/2014 | Wu et al. | |
| 9,354,064 B2 | 5/2016 | Strandjord et al. | |
| 9,587,945 B2 | 3/2017 | Strandjord et al. | |
| 9,733,084 B2 | 8/2017 | Salit et al. | |
| 9,772,187 B2 | 9/2017 | Salit et al. | |
| 2009/0296098 A1 * | 12/2009 | Sanders | G01C 19/722 |
| | | | 356/461 |
| 2014/0320863 A1 | 10/2014 | Christensen et al. | |
| 2016/0003619 A1 * | 1/2016 | Strandjord | G01C 19/727 |
| | | | 356/461 |
| 2016/0204571 A1 | 7/2016 | Wu et al. | |
| 2019/0017824 A1 * | 1/2019 | Qiu | H01S 3/1024 |

OTHER PUBLICATIONS

Zarinetchi et al., "Stimulated Brillouin fiber-optic laser gyroscope", Optics Letters, Feb. 15, 1991, pp. 229 through 231, vol. 16, No. 4, Optical Society of America.

* cited by examiner

THREE-PUMP STIMULATED BRILLOUIN SCATTERING GYROSCOPE

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

BACKGROUND

The integrated optical gyroscope, or optical gyroscope on a chip, has been a sought-after commercial and military goal for several years. A new class of chip integrated gyroscope has recently emerged, utilizing stimulated Brillouin scattering (SBS) to generate very narrow optical linewidths, which compensate for the small scale factors available to such small devices. This technology promises navigation-grade accuracy at reduced cost and size, compared to conventional ring laser gyroscopes and fiber optic gyroscopes.

A conventional SBS gyroscope on a chip is an optical waveguide ring resonator that operates based on the Sagnac effect. Brillouin scattering generates narrow lines at predetermined offset frequencies from the pump, and the effect is cascaded to generate as many as three unique and narrow frequency lines or tones. The SBS tones are then directed onto high-speed photodetectors and their beat frequency, which is rotation-sensitive due to their counter-propagating nature, is monitored over time.

However, in conventional SBS gyroscope configurations, the pump laser itself is also used as one of the readout frequencies, and this places a limit on the linewidth of the measured signal.

SUMMARY

A stimulated Brillouin scattering (SBS) gyroscope comprises an optical resonator; a first laser device in optical communication with the optical resonator, the first laser device configured to emit a first optical signal that propagates in a first direction in the optical resonator, wherein the first optical signal produces a first SBS signal in the optical resonator that counter-propagates in a second direction opposite from the first direction; a second laser device in optical communication with the optical resonator, the second laser device configured to emit a second optical signal that propagates in the first direction in the optical resonator, wherein the second optical signal produces a second SBS signal in the optical resonator that counter-propagates in the second direction; and a third laser device in optical communication with the optical resonator, the third laser device configured to emit a third optical signal that propagates in the second direction in the optical resonator, wherein the third optical signal produces a third SBS signal in the optical resonator that counter-propagates in the first direction. At least one photodetector is operatively coupled to the optical resonator and configured to receive the first, second, and third SBS signals from the optical resonator. The first, second, and third SBS signals are combined in the at least one photodetector to produce first and second electrical signals, which include rotational rate information encoded in frequencies of the first and second electrical signals.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A three-pump stimulated Brillouin scattering (SBS) gyroscope is described herein that provides for bias and noise reduction, and dead-time elimination. In the present approach, a third laser pump is locked on an adjacent resonance to two other laser pumps. Each of the three pumps generates its own SBS line, and these three frequencies are beat against one another to generate the readout signal. In addition to eliminating the pumps from the data readout, and reducing the angular random walk (ARW), this approach allows for real-time data acquisition.

The three-pump SBS gyroscope may be based on optical fiber, as well as a wide array of integrated waveguide platforms, such as an optical chip. In all cases, three pump lasers are routed into a resonator and locked to three adjacent resonances. If the pump lasers have a pattern: clockwise (CW)—counter clockwise (CCW)—CW, then the SBS lines from these pump lasers will have a pattern: CCW-CW-CCW. The CW and CCW lines shift in opposite directions under rotation of the chip.

For example, if the beat note between the first CCW-CW pair gets red-shifted, then the beat note between the second CW-CCW pair gets blue-shifted. Mixing the three SBS optical line pairs on a photodetector gives two electrical beat notes with rotational rate information encoded in the frequency of two electrical signals. After the photodetector, these two signals are combined, and their low frequency electrical beat note is directed onto a frequency counter, providing a rotation-sensitive output frequency of interest.

Further details of various embodiments are described hereafter with reference to the drawings.

Figure 1:
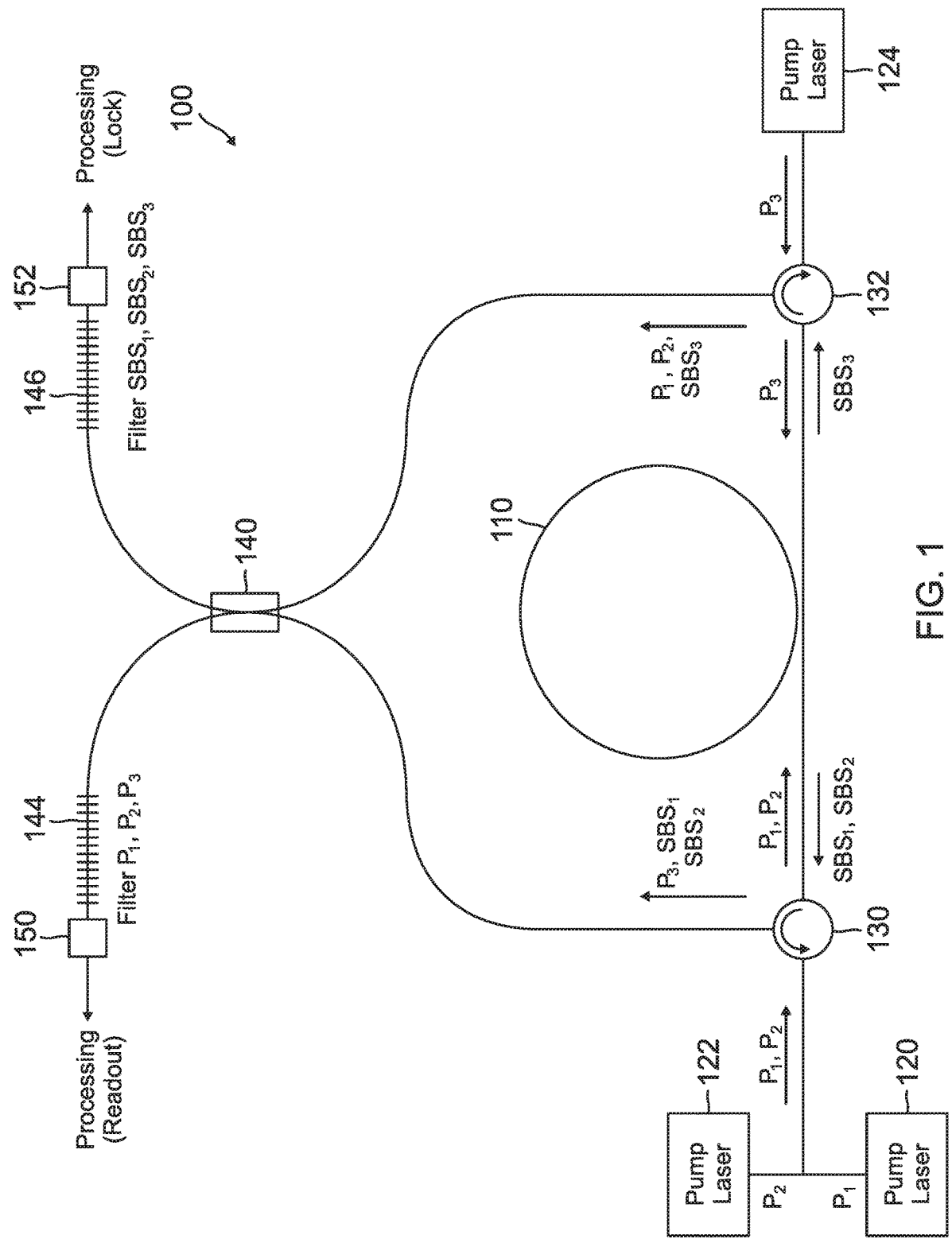
FIG. 1 is a schematic diagram of a three-pump stimulated Brillouin scattering (SBS) gyroscope, according to one embodiment.

FIG. 1 schematically illustrates a general architecture layout of a three-pump SBS gyroscope 100, according to an exemplary embodiment. The SBS gyroscope 100 generally includes an optical resonator 110, which is in optical communication with a first pump laser device 120, a second pump laser device 122, and a third pump laser device 124. A first optical circulator 130 is located along the optical path between first and second pump laser devices 120, 122, and optical resonator 110. A second optical circulator 132 is located along the optical path between third pump laser device 124 and optical resonator 110.

In one embodiment, optical resonator 110 is formed as a ring resonator, such as a fiber optic coil wound around a core and about an axis around which rotation is sensed. In another embodiment, optical resonator 110 is formed on an optical chip using waveguides.

The first pump laser device 120 is configured to emit a first optical signal (P1) that propagates in a first direction, such as a CCW direction, and is directed to optical resonator 110 through optical circulator 130. The first optical signal produces a first SBS signal ($SBS_1$) in optical resonator 110 that counter-propagates in an opposite second direction, such as a CW direction, and is directed toward optical circulator 130.

The second pump laser device 122 is configured to emit a second optical signal ($P_2$) that propagates in the first direction (CCW direction), and is directed to optical resonator 110 through optical circulator 130. The second optical signal produces a second SBS signal ($SBS_2$) in optical resonator 110 that counter-propagates in the second direction (CW direction), and is directed toward optical circulator 130.

The third pump laser device 124 is configured to emit a third optical signal ($P_3$) that propagates in the second direction (CW direction), and is directed to optical resonator 110 through optical circulator 132. The third optical signal produces a third SBS signal ($SBS_3$) in optical resonator 110 that counter-propagates in the first direction (CCW direction) and is directed toward optical circulator 132.

As shown in FIG. 1, the first SBS signal ($SBS_1$) and the second SBS signal ($SBS_2$) each counter-propagate in the opposite direction from the first and second optical signals ($P_1$, $P_2$). In addition, the third SBS signal ($SBS_3$) counter-propagates in the opposite direction from the third optical signal ($P_3$).

The optical circulator 130 also directs the third optical signal ($P_3$), and the first and second SBS signals ($SBS_1$, $SBS_2$), from optical resonator 110 to an optical coupler 140. The optical circulator 132 also directs the first and second optical signals ($P_1$ and $P_2$), and the third SBS signal ($SBS_3$), from optical resonator 110 to optical coupler 140.

The optical coupler 140 directs a first portion of each of the optical signals ($P_1$, $P_2$, $P_3$) to a first optical filter 144 along a first optical path, and a second portion of the optical signals to a second optical filter 146 along a second optical path. The optical coupler 140 also directs a first portion of each of the SBS signals ($SBS_1$, $SBS_2$, $SBS_3$) to first optical filter 144, and a second portion of the SBS signals to second optical filter 146.

The first optical filter 144 filters out the first portion of the optical signals while passing the first portion of the SBS signals to a first photodetector 150. The second optical filter 146 filters out the second portion of the SBS signals while passing the second portion of the optical signals to a second photodetector 152.

The first photodetector 150 combines the first portion of the SBS signals ($SBS_1$, $SBS_2$, $SBS_3$) to produce a first set of electrical signals, which are sent to a readout device for further processing. The rotational rate information for the gyroscope is encoded in the frequencies of the first set of electrical signals. The second photodetector 152 combines the second portion of the optical signals ($P_1$, $P_2$, $P_3$) to produce a second set of electrical signals that are sent to one or more locking devices for further processing, to provide frequency locking for the pump laser devices.

Figure 2:
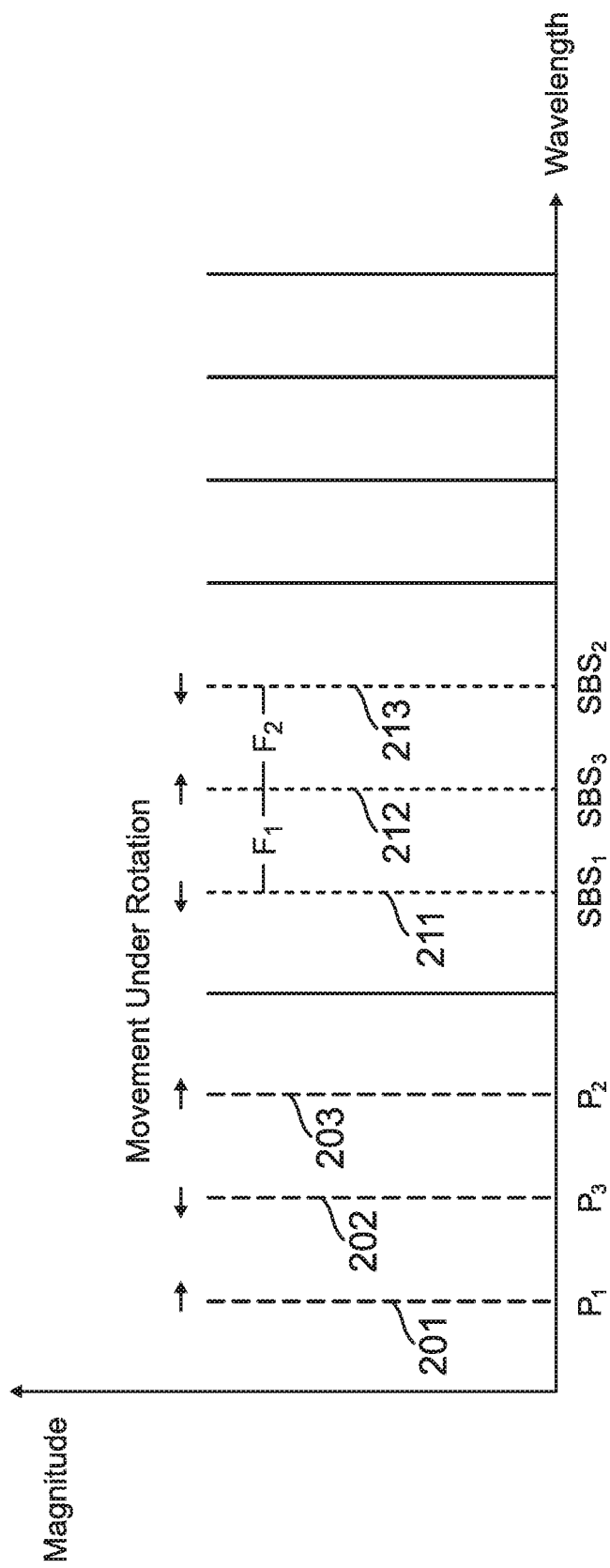
FIG. 2 is a graphical representation of the spectral content produced by the three-pump SBS gyroscope of FIG. 1.

FIG. 2 is a graphical representation of the spectral content produced by the SBS gyroscope of FIG. 1, showing movement under rotation. The spectral lines 201, 202, and 203 correspond to the frequency response of the optical resonator for adjacent resonances produced by the first optical signal ($P_1$), third optical signal ($P_3$), and second optical signal ($P_2$), from the respective three laser pumps. The first and second optical signals ($P_1$, $P_2$) co-propagate in a first direction (CCW), and the third optical signal ($P_3$) counter-propagates in a second opposite direction (CW). Each pair of adjacent resonances is separated by a free spectral range (FSR).

The spectral lines 211, 212, and 213 correspond to adjacent first, third, and second SBS signals ($SBS_1$, $SBS_3$, $SBS_2$) respectively produced by the three optical signals ($P_1$, $P_3$, $P_2$) in the optical resonator. The first and second SBS signals ($SBS_1$, $SBS_2$) counter-propagate in an opposite direction (CW) relative to the direction (CCW) of the first and second optical signals ($P_1$, $P_2$). The third SBS signal ($SBS_3$) counter-propagates in an opposite direction (CCW) relative to the direction (CW) of the third optical signal ($P_3$). Each pair of adjacent SBS signals is also separated by a FSR.

As shown in FIG. 2, the first and second optical signals ($P_1$, $P_2$) and the third SBS signal ($SBS_3$) are more than one FSR away from each other. A first optical beat frequency ($F_1$) can be determined from the difference between $SBS_1$ and $SBS_3$, and a second optical beat frequency ($F_2$) can be determined from the difference between $SBS_3$ and $SBS_2$. The difference between the first and second optical beat frequencies ($F_1-F_2$) is proportional to the rotation rate.

In addition, each of the beat frequencies is proportional to the rotation rate. The $F_1$ and $F_2$ beats are proportional to rotation rate with opposite signs. It also happens that each single beat has contribution from thermal effects that match each other and are canceled out when differences are taken between the beats.

Example Embodiments

Example 1 includes a stimulated Brillouin scattering (SBS) gyroscope, comprising: an optical resonator; a first laser device in optical communication with the optical resonator, the first laser device configured to emit a first optical signal that propagates in a first direction in the optical resonator, wherein the first optical signal produces a first SBS signal in the optical resonator that counter-propagates in a second direction opposite from the first direction; a second laser device in optical communication with the optical resonator, the second laser device configured to emit a second optical signal that propagates in the first direction, in the optical resonator, wherein the second optical signal produces a second SBS signal in the optical resonator that counter-propagates in the second direction; a third laser device in optical communication with the optical resonator, the third laser device configured to emit a third optical signal that propagates in the second direction in the optical resonator, wherein the third optical signal produces a third SBS signal in the optical resonator that counter-propagates in the first direction; and at least one photodetector operatively coupled to the optical resonator and configured to receive the first, second, and third SBS signals from the optical resonator; wherein the first, second, and third SBS signals are combined in the at least one photodetector to produce first and second electrical signals, which include rotational rate information encoded in frequencies of the first and second electrical signals.

Example 2 includes the SBS gyroscope of Example 1, wherein the optical resonator comprises a ring resonator.

Example 3 includes the SBS gyroscope of Example 1, wherein the optical resonator comprises a fiber optic coil.

Example 4 includes the SBS gyroscope of Example 1, wherein the optical resonator comprises one or more waveguides on an optical chip.

Example 5 includes the SBS gyroscope of any of Examples 1-4, wherein the laser devices are pump lasers.

Example 6 includes the SBS gyroscope of any of Examples 1-5, wherein the first direction is a counterclockwise (CCW) direction in the optical resonator, and the second direction is a clockwise (CW) direction in the optical resonator.

Example 7 includes the SBS gyroscope of any of Examples 1-6, further comprising: a first optical circulator configured to direct the first and second optical signals to the optical resonator; and a second optical circulator configured to direct the third optical signal to the optical resonator.

Example 8 includes the SBS gyroscope of any of Examples 1-7, wherein a first optical beat frequency ($F_1$) is determined from a difference between the first SBS signal and the third SBS signal, and a second optical beat frequency ($F_2$) is determined from a difference between the third SBS signal and the second SBS signal.

Example 9 includes the SBS gyroscope of Example 8, wherein a difference between the first and second optical beat frequencies ($F_1-F_2$) is proportional to a rotation rate.

Example 10 includes an SBS gyroscope comprising: an optical resonator; a first laser device in optical communication with the optical resonator, the first laser device configured to emit a first optical signal that propagates in a first direction in the optical resonator, wherein the first optical signal produces a first SBS signal in the optical resonator that counter-propagates in a second direction opposite from the first direction; a second laser device in optical communication with the optical resonator, the second laser device configured to emit a second optical signal that propagates in the first direction in the optical resonator, wherein the second optical signal produces a second SBS signal in the optical resonator that counter-propagates in the second direction; a third laser device in optical communication with the optical resonator, the third laser device configured to emit a third optical signal that propagates in the second direction in the optical resonator, wherein the third optical signal produces a third SBS signal in the optical resonator that counter-propagates in the first direction; a first optical circulator located along an optical path between the first and second laser devices, and the optical resonator, wherein the first optical circulator is configured to direct the first and second optical signals to the optical resonator; a second optical circulator located along an optical path between the third laser device and the optical resonator, wherein the second optical circulator is configured to direct the third optical signal to the optical resonator; an optical coupler in optical communication with the first and second optical circulators, wherein the optical coupler is configured to receive: the third optical signal, and the first and second SBS signals, from the first optical circulator; and the first and second optical signals, and the third SBS signal, from the second optical circulator; wherein the optical coupler is configured to output a first portion and a second portion of each of the SBS signals, and to output a first portion and a second portion of each of the optical signals; a first photodetector in optical communication with the optical coupler, wherein the first photodetector is configured to receive the first portion of the SBS signals from the optical coupler; and a second photodetector in optical communication with the optical coupler, wherein the second photodetector is configured to receive the second portion of the optical signals from the optical coupler; wherein the first photodetector combines the first portion of the SBS signals to produce a first set of electrical signals, which are sent to a readout device for further processing; wherein the second photodetector combines the second portion of the optical signals to produce a second set of electrical signals that are sent to one or more locking devices for further processing; wherein rotational rate information for the gyroscope is encoded in frequencies of the first set of electrical signals.

Example 11 includes the SBS gyroscope of Example 10, wherein the optical resonator comprises a ring resonator.

Example 12 includes the SBS gyroscope of Example 10, wherein the optical resonator comprises a fiber optic coil.

Example 13 includes the SBS gyroscope of Example 10, wherein the optical resonator comprises one or more waveguides on an optical chip.

Example 14 includes the SBS gyroscope of any of Examples 10-13, wherein the laser devices are pump lasers.

Example 15 includes the SBS gyroscope of any of Examples 10-14, wherein the first direction is a counterclockwise (CCW) direction in the optical resonator, and the second direction is a clockwise (CW) direction in the optical resonator.

Example 16 includes the SBS gyroscope of Example 10, further comprising: a first optical filter located along an optical path between the optical coupler and the first photodetector, wherein the first optical filter is configured to filter out the first portion of the optical signals received from the optical coupler, while passing the first portion of the SBS signals to the first photodetector; and a second optical filter located along an optical path between the optical coupler and the second photodetector, wherein the second optical filter is configured to filter out the second portion of the SBS signals received from the optical coupler, while passing the second portion of the optical signals to the second photodetector.

Example 17 includes the SBS gyroscope of any of Examples 10-16, wherein the one or more locking devices provide frequency locking for the laser devices.

Example 18 includes the SBS gyroscope of any of Examples 10-17, wherein a first optical beat frequency ($F_1$) is determined from a difference between the first SBS signal and the third SBS signal, and a second optical beat frequency ($F_2$) is determined from a difference between the third SBS signal and the second SBS signal.

Example 19 includes the SBS gyroscope of Example 18, wherein a difference between the first and second optical beat frequencies ($F_1-F_2$) is proportional to a rotation rate.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A stimulated Brillouin scattering (SBS) gyroscope, comprising:
    an optical resonator;
    a first laser device in optical communication with the optical resonator, the first laser device configured to emit a first optical signal that propagates in a first direction in the optical resonator, wherein the first optical signal produces a first SBS signal in the optical resonator that counter-propagates in a second direction opposite from the first direction;

a second laser device in optical communication with the optical resonator, the second laser device configured to emit a second optical signal that propagates in the first direction, in the optical resonator, wherein the second optical signal produces a second SBS signal in the optical resonator that counter-propagates in the second direction;

a third laser device in optical communication with the optical resonator, the third laser device configured to emit a third optical signal that propagates in the second direction in the optical resonator, wherein the third optical signal produces a third SBS signal in the optical resonator that counter-propagates in the first direction;

an optical coupler in optical communication with the optical resonator, wherein the optical coupler is configured to:
  receive the optical signals and the SBS signals from the optical resonator; and
  output a first portion and a second portion of each of the SBS signals, and
output a first portion and a second portion of each of the optical signals;

a first photodetector in optical communication with the optical coupler;

a second photodetector in optical communication with the optical coupler, a first optical filter located along an optical path between the optical coupler and the first photodetector, wherein the first optical filter is configured to filter out the first portion of the optical signals received from the optical coupler, while passing the first portion of the SBS signals to the first photodetector; and a second optical filter located along an optical path between the optical coupler and the second photodetector, wherein the second optical filter is configured to filter out the second portion of the SBS signals received from the optical coupler, while passing the second portion of the optical signals to the second photodetector;

wherein the first photodetector combines the first portion of the SBS signals to produce a first set of electrical signals;

wherein rotational rate information for the gyroscope is encoded in frequencies of the first set of electrical signals.

2. The SBS gyroscope of claim 1, wherein the optical resonator comprises a ring resonator.

3. The SBS gyroscope of claim 1, wherein the optical resonator comprises a fiber optic coil.

4. The SBS gyroscope of claim 1, wherein the optical resonator comprises one or more waveguides on an optical chip.

5. The SBS gyroscope of claim 1, wherein the laser devices are pump lasers.

6. The SBS gyroscope of claim 1, wherein the first direction is a counterclockwise (CCW) direction in the optical resonator, and the second direction is a clockwise (CW) direction in the optical resonator.

7. The SBS gyroscope of claim 1, further comprising:
a first optical circulator configured to direct the first and second optical signals to the optical resonator; and
a second optical circulator configured to direct the third optical signal to the optical resonator;
wherein the second photodetector combines the second portion of the optical signals to produce a second set of electrical signals that are sent to one or more locking devices that provide frequency locking for one or more of the laser devices.

8. The SBS gyroscope of claim 1, wherein a first optical beat frequency ($F_1$) is determined from a difference between the first SBS signal and the third SBS signal, and a second optical beat frequency ($F_2$) is determined from a difference between the third SBS signal and the second SBS signal.

9. The SBS gyroscope of claim 8, wherein a difference between the first and second optical beat frequencies ($F_1$-$F_2$) is proportional to a rotation rate.

10. A stimulated Brillouin scattering (SBS) gyroscope, comprising:
an optical resonator;
a first laser device in optical communication with the optical resonator, the first laser device configured to emit a first optical signal that propagates in a first direction in the optical resonator, wherein the first optical signal produces a first SBS signal in the optical resonator that counter-propagates in a second direction opposite from the first direction;
a second laser device in optical communication with the optical resonator, the second laser device configured to emit a second optical signal that propagates in the first direction in the optical resonator, wherein the second optical signal produces a second SBS signal in the optical resonator that counter-propagates in the second direction;
a third laser device in optical communication with the optical resonator, the third laser device configured to emit a third optical signal that propagates in the second direction in the optical resonator, wherein the third optical signal produces a third SBS signal in the optical resonator that counter-propagates in the first direction;
a first optical circulator located along an optical path between the first and second laser devices, and the optical resonator, wherein the first optical circulator is configured to direct the first and second optical signals to the optical resonator;
a second optical circulator located along an optical path between the third laser device and the optical resonator, wherein the second optical circulator is configured to direct the third optical signal to the optical resonator;
an optical coupler in optical communication with the first and second optical circulators, wherein the optical coupler is configured to receive:
  the third optical signal, and the first and second SBS signals, from the first optical circulator; and
  the first and second optical signals, and the third SBS signal, from the second optical circulator;
  wherein the optical coupler is configured to output a first portion and a second portion of each of the SBS signals, and to output a first portion and a second portion of each of the optical signals;
a first photodetector in optical communication with the optical coupler; and
a second photodetector in optical communication with the optical coupler;
a first optical filter located along an optical path between the optical coupler and the first photodetector, wherein the first optical filter is configured to filter out the first portion of the optical signals received from the optical coupler, while passing the first portion of the SBS signals to the first photodetector; and
a second optical filter located along an optical path between the optical coupler and the second photodetector, wherein the second optical filter is configured to filter out the second portion of the SBS signals received from the optical coupler, while passing the second portion of the optical signals to the second photodetector;

wherein the first photodetector combines the first portion of the SBS signals to produce a first set of electrical signals, which are sent to a readout device for further processing;

wherein the second photodetector combines the second portion of the optical signals to produce a second set of electrical signals that are sent to one or more locking devices for further processing;

wherein rotational rate information for the gyroscope is encoded in frequencies of the first set of electrical signals.

11. The SBS gyroscope of claim 10, wherein the optical resonator comprises a ring resonator.

12. The SBS gyroscope of claim 10, wherein the optical resonator comprises a fiber optic coil.

13. The SBS gyroscope of claim 10, wherein the optical resonator comprises one or more waveguides on an optical chip.

14. The SBS gyroscope of claim 10, wherein the laser devices are pump lasers.

15. The SBS gyroscope of claim 10 wherein the first direction is a counterclockwise (CCW) direction in the optical resonator, and the second direction is a clockwise (CW) direction in the optical resonator.

16. The SBS gyroscope of claim 10, wherein the one or more locking devices provide frequency locking for the laser devices.

17. The SBS gyroscope of claim 10, wherein a first optical beat frequency ($F_1$) is determined from a difference between the first SBS signal and the third SBS signal, and a second optical beat frequency ($F_2$) is determined from a difference between the third SBS signal and the second SBS signal.

18. The SBS gyroscope of claim 17, wherein a difference between the first and second optical beat frequencies ($F_1$-$F_2$) is proportional to a rotation rate.

* * * * *